M. M. BAILEY.
VEHICLE WHEEL.
APPLICATION FILED MAR. 16, 1907.

No. 912,438.

Patented Feb. 16, 1909.
4 SHEETS—SHEET 1.

Witnesses
G. Howard Walmsley,
Edward J. Reed

Inventor
Marion Milton Bailey,
By H. A. Toulmin,
Attorney

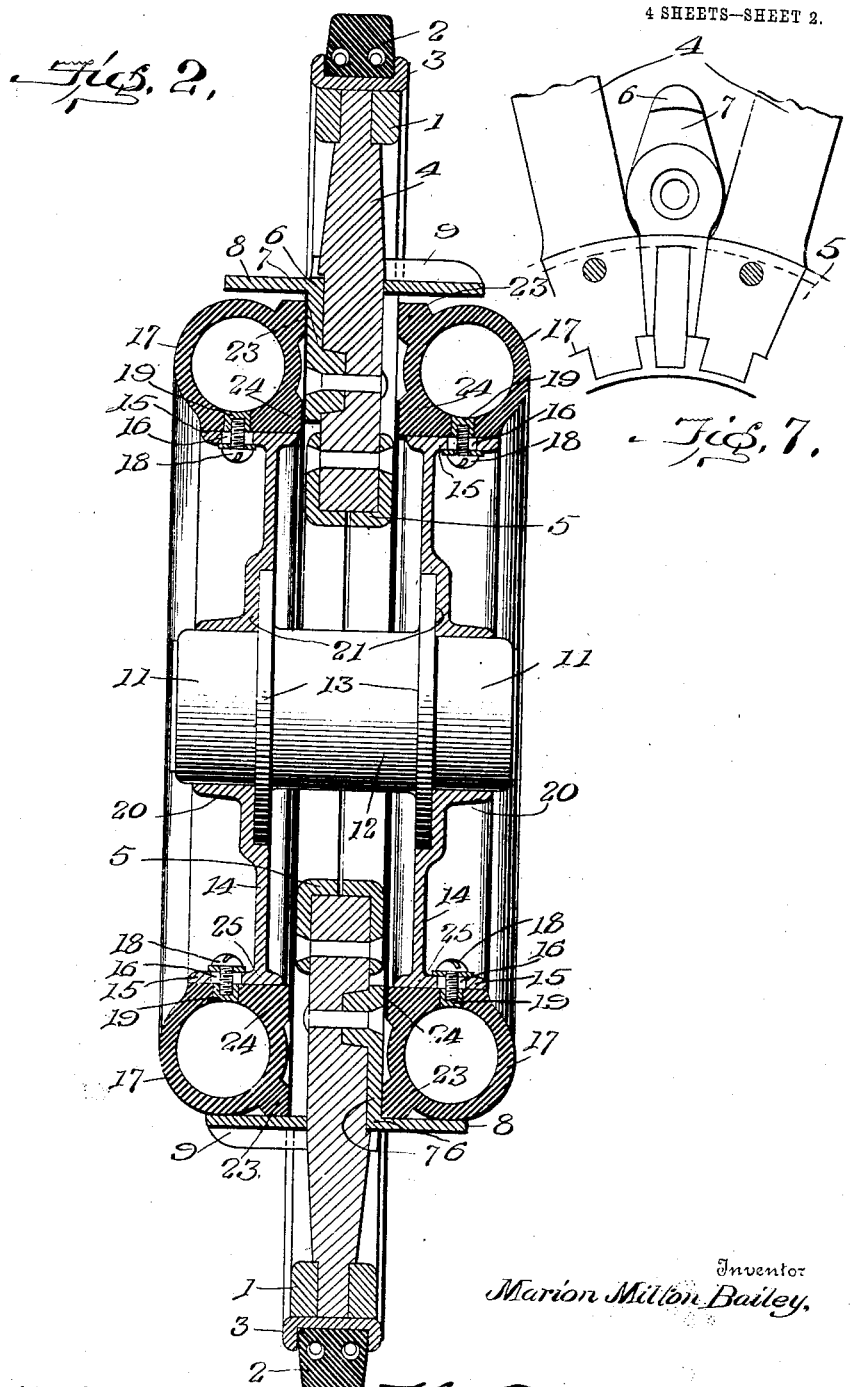

M. M. BAILEY.
VEHICLE WHEEL.
APPLICATION FILED MAR. 16, 1907.
912,438.
Patented Feb. 16, 1909.
4 SHEETS—SHEET 3.
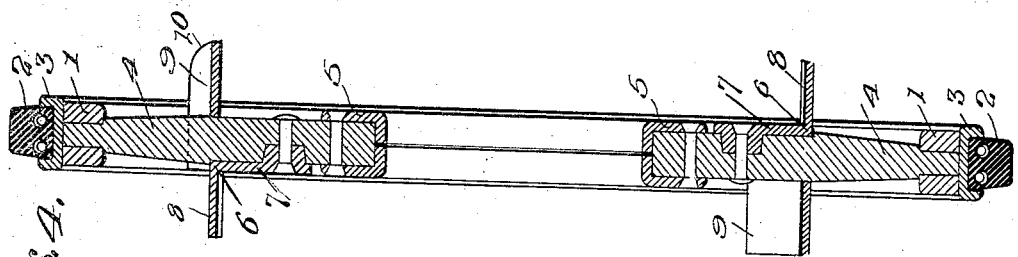
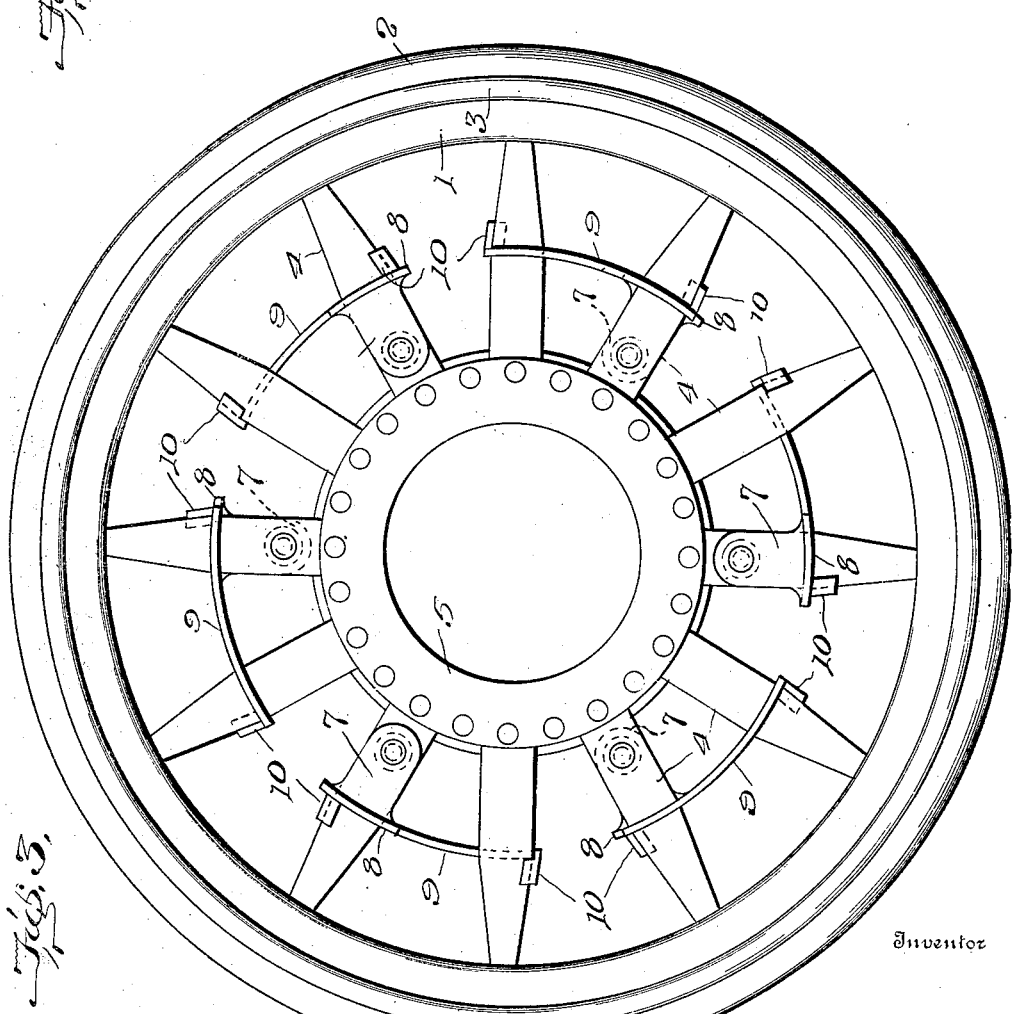
Witnesses
G. Howard Walmsley.
Edward F. Reed
Inventor
Marion Milton Bailey,
By
Attorney

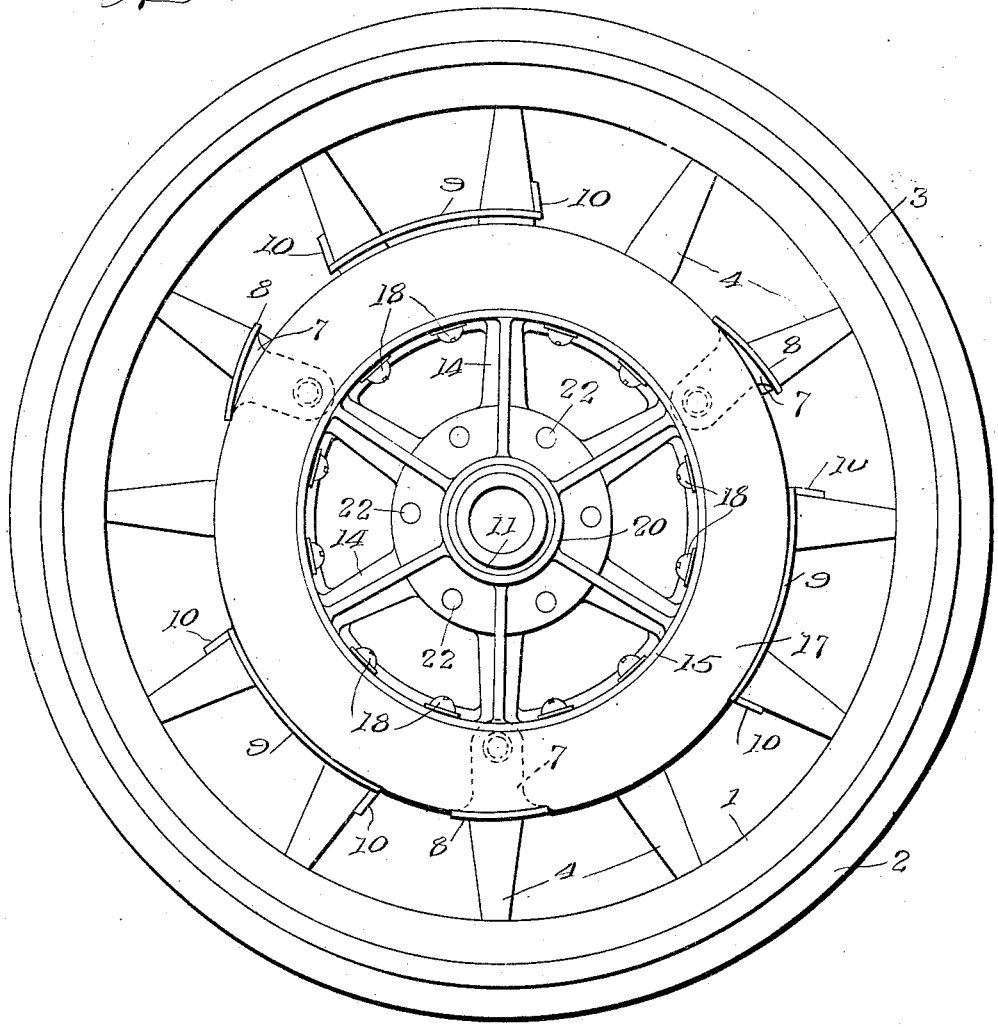

UNITED STATES PATENT OFFICE.

MARION MILTON BAILEY, OF SPRINGFIELD, OHIO.

VEHICLE-WHEEL.

No. 912,438.

Specification of Letters Patent.

Patented Feb. 16, 1909.

Application filed March 16, 1907. Serial No. 362,603.

*To all whom it may concern:*

Be it known that I, MARION MILTON BAILEY, a citizen of the United States, residing at Springfield, in the county of Clark and State of Ohio, have invented certain new and useful Improvements in Vehicle-Wheels, of which the following is a specification, reference being had therein to the accompanying drawings.
The present invention relates to vehicle-wheels of that type in which the hub of the wheel is capable of movement relatively to the ground wheel and in which a resilient body is interposed between the hub and the ground wheel.

The object of the invention is to provide a wheel of this character in which will be obtained the full benefit of the resiliency of the interposed body without subjecting the same to the friction which is usually incident to wheels of this character, and a further object of the invention is to provide a wheel of this character in which the ground wheel will be capable of a lateral movement relatively to the resilient body; to provide means for supporting the ground wheel normally in a vertical position, means for cushioning the lateral movement of the ground wheel, and means for preventing further lateral movement of the ground wheel when the same has reached a predetermined point.

With these objects in view my invention consists in the organization and other features to be hereinafter described, and then more fully pointed out in the claims.

Figure 1:
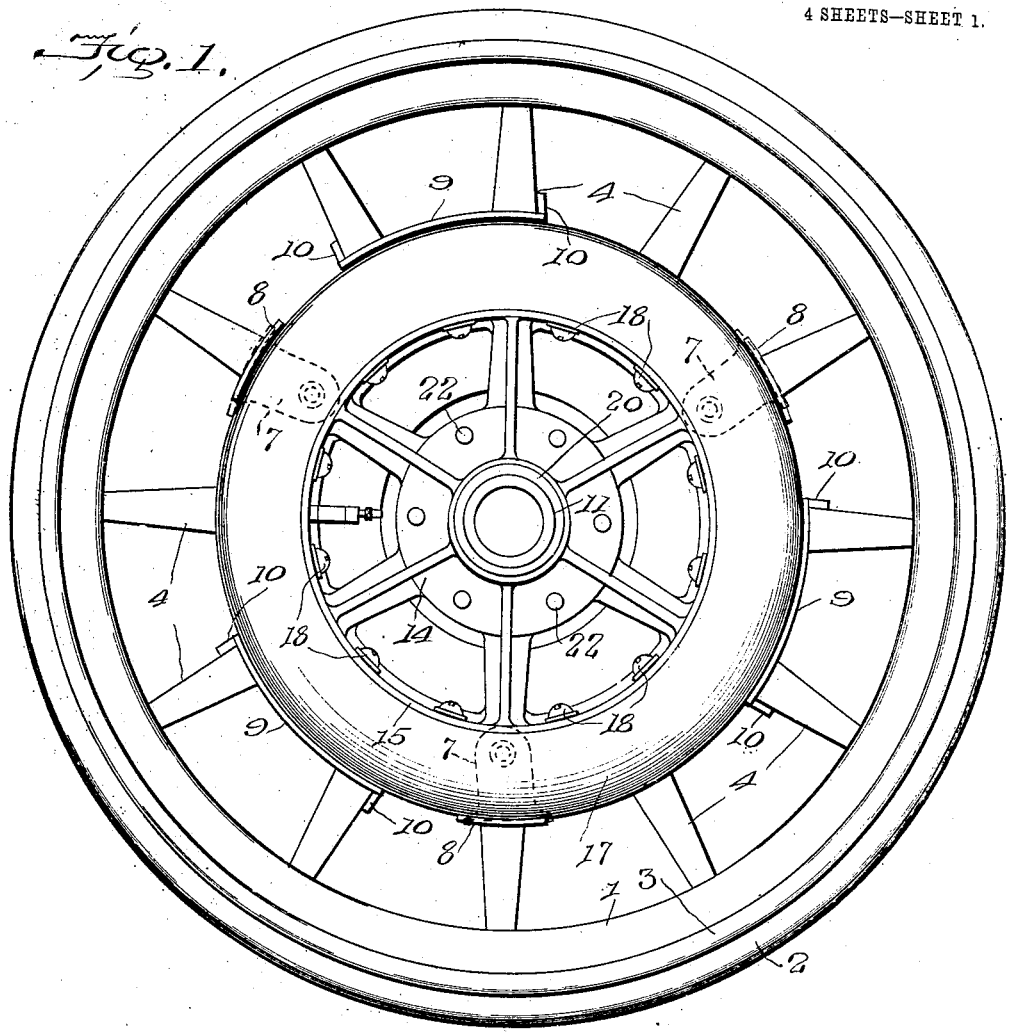
Figure 5:
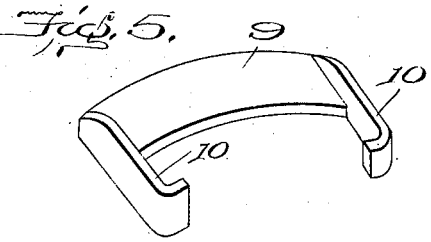

In the accompanying drawings, Figure 1 is a side elevation of a wheel embodying my invention; Fig. 2 is a section taken centrally through the same; Fig. 3 is a side elevation of the ground wheel with the main hub and resilient body removed; Fig. 4 is a section taken centrally through the same; Fig. 5 is a detail view of one of the fixed supporting brackets; Fig. 6 is a side elevation of a wheel showing the position of the resilient body and pivoted brackets when the wheel is in motion; and Fig. 7 is a fractional view of the ground wheel showing a slightly modified form of the same.

In these drawings I have illustrated the preferred form of my invention, in which the reference numeral 1 indicates the ground wheel which is provided with a rim and tire of any suitable character, that here shown consisting of an ordinary rubber tire 2 mounted in a channeled rim 3. The felly of this wheel is connected by the spokes 4, which are rigidly secured thereto, with a ring or auxiliary hub 5, which forms the center of the ground wheel and preferably consists of two annular angle irons, which form a channel U-shaped in cross section and adapted to receive the inner ends of the spokes 4 which are rigidly secured therein in any suitable manner.

Mounted on the opposite sides of the wheel 1 are a plurality of movable brackets 6, each of which preferably comprises a radial arm 7 which is pivoted at its inner end to one of the spokes 4 of the wheel or to the annular angle irons of the auxiliary hub and is provided at its outer end with a plate or projection 8 extending at substantially right angles to the arm 7 and in a direction away from the wheel. These brackets may be of any suitable number, but I prefer to employ three, on each side of the ground wheel, as here shown, and to arrange the same at equal intervals about the surface of the wheel. These brackets 6 are so mounted upon the spokes 4 or auxiliary hub as to cause the radial arm 7 thereof to project a slight distance beyond the edge of the spoke and the face of the wheel, thus providing on each side of the wheel 3 projecting bearing surfaces. The wheel is also provided on each side with a plurality of fixed brackets which extend at substantially right angles to the wheel and are preferably equal in number to the movable brackets and are arranged alternately with the movable brackets. These fixed brackets may be formed in any suitable manner, but I prefer to construct the same of a plate 9, which is curved outwardly to conform to an arc of the wheel and is provided near its opposite ends with hook-shaped members 10 adapted to extend about the opposite sides of two adjacent spokes and separated by a distance sufficient to cause the same to bind against the sides of the spokes when the plate has been moved outward to its proper position. The fixed brackets 9 are mounted upon the ground wheel at a slightly greater distance, say about a quarter of an inch, from the center of the wheel than are the plates 8 of the pivoted brackets.

The primary or main hub of the wheel is indicated at 11 and comprises a bearing sleeve 12 provided near its opposite ends with outwardly extending flanges 13. This hub is adapted to extend through the auxiliary hub or ring 5 and is of an exterior diameter considerably less than the diameter of the auxiliary hub, thus permitting the same to move radially to the ground wheel through a considerable space. This hub is provided near its opposite ends with removable frames which may be of any suitable construction, but preferably consist of a spider 14 provided at its outer edge with a flat rim 15, provided with elongated bolt holes 16 and adapted to receive thereon the resilient body 17 which is preferably in the form of a pneumatic tube of special construction and is secured to the rim by means of screws or bolts 18 extending through the bolt holes 16 and engaging lugs 19 embedded in the resilient body. The frame 14 is provided at its center with an aperture or hub portion 20, adapted to fit over the ends of the bearing sleeve 12 and provided with an annular recess 21 formed in the inner face of the frame, about said hub portion, and adapted to receive the flange 13 of the bearing sleeve 12, to which it is secured by any suitable means, such as the bolts 22. The diameter of the frame with the resilient body secured thereto is such as to cause the same to extend parallel with the ground wheel for a considerable distance beyond the ring or auxiliary hub 5 and to bring the peripheries of the resilient bodies 17 into lateral and peripheral engagement with the pivoted brackets 6 when the frame 14 is in position on the hub 11 and the hub is in position in the ground wheel. Thus it will be seen that the wheel is practically a triple wheel comprising a ground wheel and the two auxiliary wheels consisting of the frames 14 with their resilient bodies which extend on either side of and laterally embrace the ground wheel.

As stated, the resilient body 17 may be of any suitable construction, but I prefer to construct the same of an annular pneumatic tube which is provided, at the outer edge of that face thereof which lies adjacent to the ground wheel, with a shoulder or projection 23 adapted to engage the projecting radial arms 7 of the pivoted brackets and provided at the inner edge of the same side thereof with a shoulder or projection 24 of less width than the shoulder 23 and normally out of engagement with the arms 7, but of sufficient width to project beyond the inner edge 25 of the rim 15.

When the wheel is in its normal position and the main hub is not supporting a load, this hub will be substantially in the center of the auxiliary hub 5 and the pivoted brackets 6 will be in engagement with the periphery of the resilient body and the fixed brackets will be out of engagement therewith. When a load is placed upon the main hub, such as when the same is in position on the axle of the vehicle and supporting a portion of the weight of the same and its contents, the portion or portions of the resilient body which are in engagement with the pivoted bracket or brackets which lie below the wheel center, are compressed, allowing the hub to move to a position below the wheel center and bringing the portion or portions of the resilient body, which lie adjacent to the fixed bracket or brackets which are below the wheel center, into engagement therewith, thus providing an additional support for the lower portion of the resilient body when the wheel is supporting a load. When power is applied to the axle to rotate the wheel, the first impulse is absorbed by the resilient bodies which are rotated a slight distance forward relatively to the ground wheel, carrying with them the several pivoted brackets which are in engagement therewith, thus moving these brackets about their pivotal centers and thereby shortening the distance between the forward edges of the brackets and the center of the wheel, and causing the same to compress and firmly grip the periphery of the resilient bodies, assisting the fixed brackets, and causing the ground wheel to move forward with the resilient bodies and the hub, and preventing further forward movement of the resilient bodies independently of the ground wheel. This construction of the wheel serves to practically eliminate all friction between the resilient body and its support upon the ground wheel incident to the vertical movement of the ground wheel and the resilient body relatively one to the other, inasmuch as the only supports in engagement with the forward or rearward portions of the resilient body are pivoted to the ground wheel and move with the body when it moves vertically relatively to the ground wheel, and, inasmuch as the only fixed support which is in engagement with the wheel, is beneath the wheel center and as to which the resilient body has no relative movement, except as the body generally vibrates, but which vibrations, being merely due to the jarring of the machine in running, do not generally lift the resilient body from such lower support, or if they lift it at all from such support, still the movement is merely to and from the support without any rubbing effect. Therefore, as between the resilient body and all the supports, both the pivotal and fixed, there is no such relative movement as to cause wear and friction to destroy or injure these bodies.

When the wheel is subjected to a lateral strain, the lower portion of the ground wheel is moved laterally relatively to the resilient bodies, thus causing the radial arm 7 of that pivoted bracket 6, which is nearest the point of strain, to compress the shoulder 23 of the resilient body, which is in engagement therewith, thereby cushioning the lateral movement of the ground wheel, and which is returned to its normal position by the resiliency of the body 17 as soon as the strain is removed therefrom. Should the strain be a severe one and serve to move the ground wheel laterally through a distance greater than the space lying between the shoulder 24 and the radial arm 7, then the arm will engage the shoulder 24 which will serve to check or control the movement of the wheel, as this shoulder does not serve to compress the body 17, but has merely the resiliency of the soft rubber, of which it is composed, and, should the strain be sufficient to compress the shoulder 24, the arm 7 will come into contact with the shoulder 25 on the rim 15 which forms a positive stop and prevents further lateral movement of the ground wheel, thus preventing the same from being moved through a distance sufficient to injure the wheel or any of its parts. It will further be understood that the lateral movement of the wheel takes place from a fulcrum point, as it were, at a place on the shoulder 23 about or generally diametrically opposite the point of contact on said shoulder 23 where the lateral thrust is resisted, but that such upper or fulcrum point of contact with the shoulder 23 is against the opposite resilient body 17 or the one on the other side of the ground wheel. Thus it will be seen that I have provided for the longevity or preservation of the life and integrity of the resilient bodies, saving them from wear and destruction by friction, yet without impairing their efficiency; indeed, have but added to their capacity in this respect by the means adopted to preserve them; and that I have also made provision for this matter of yielding to lateral thrusts of the ground wheel. I have also provided for allowing the forward rotative impulse, utilized in driving the machine, to be taken up by the resilient bodies and transferred to the ground wheels without shock to either or wearing injury to the resilient bodies themselves. It will be seen that in response to this rotative impulse, (either forward or backward), the resilient bodies first rotate a short distance without really imparting their movement to the ground wheels, and then, by the automatic action of the pivoted supports, transfer their motion to the ground wheels.

In addition to the features above mentioned it will be observed that the wheel, as herein constructed, is provided with a resilient carrying member which is so related to the wheel that the latter receives the full benefit of its resiliency, but which is so mounted as not to be subject to the usual danger of being punctured.

These several operations and their results I regard myself as the first to accomplish and I wish it, therefore, to be understood that I do not desire to be limited to the exact details of construction shown and described, for obvious modifications will occur to a person skilled in the art.

Having thus fully described my invention, what I claim as new and desire to secure by Letters Patent, is:—

1. In a wheel of the character described, the combination, with the ground wheel, and a hub capable of movement relatively thereto, of an annular resilient body mounted on said hub, and a plurality of brackets pivotally mounted on said ground wheel and engaging said resilient body at intervals about the circumference thereof.

2. In a wheel of the character described, the combination, with the ground wheel, and a hub capable of movement relatively thereto, of an annular resilient body mounted on said hub, and a plurality of brackets pivotally mounted on said ground wheel and engaging said resilient body at equal intervals about the circumference thereof.

3. In a wheel of the character described, the combination, with the ground wheel and a hub capable of movement relatively thereto, of an annular resilient body mounted on said hub, a plurality of brackets pivotally mounted on said ground wheel and engaging said resilient body at intervals about its circumference, and a plurality of other brackets rigidly secured to said ground wheel and normally out of engagement with the circumference of said resilient body.

4. In a wheel of the character described, the combination, with the ground wheel and a hub capable of movement relatively thereto, of an annular resilient body mounted on said hub, a plurality of brackets pivotally mounted on said ground wheel and engaging said resilient body at intervals about the circumference thereof, and a plurality of brackets rigidly secured to said ground wheel, arranged alternately with said pivoted brackets and normally out of engagement with said resilient body.

5. In a wheel of the character described, the combination, with the ground wheel and a hub capable of movement relatively thereto, of annular resilient bodies mounted on said hub and located on opposite sides of said ground wheel, and brackets pivotally mounted on said ground wheel and adapted to engage the peripheries of said resilient bodies, the pivoted brackets on one side of said wheel being located between the pivoted brackets on the opposite side thereof.

6. In a wheel of the character described, the combination, with the ground wheel and a hub capable of movement relatively thereto, of annular resilient bodies carried by said hub and located on opposite sides of said ground wheel, brackets pivotally mounted on both sides of said ground wheel and adapted to engage the peripheries of said resilient bodies, other brackets rigidly mounted on both sides of said ground wheel and normally out of engagement with said resilient bodies, the fixed brackets on one side of said wheel being opposite the pivoted brackets on the opposite sides of said wheel.

7. In a wheel of the character described, the combination, with the ground wheel and a hub capable of movement relatively thereto, of frames mounted near the opposite ends of said hub having hub portions removably secured to said hub and provided with rims at their outer edges having a flat periphery, and a resilient body adjustably mounted on each of said rims and interposed between said hub and said wheel.

8. In a wheel of the character described, the combination, with the hub, the frames mounted near the ends thereof, and the ground wheel mounted between said frames and capable of lateral movement relatively thereto, of resilient bodies carried by said frames and each having a shoulder adapted to engage the adjacent side of said ground wheel.

9. In a wheel of the character described, the combination, with the hub, the frames mounted near the ends thereof, and the ground wheel mounted between said frames and capable of lateral movement relatively thereto, of resilient bodies carried by said frames and each having a plurality of shoulders arranged at successively increasing distances from said ground wheel and adapted to successively engage the adjacent side of said ground wheel as the same moves towards said resilient body.

10. In a wheel of the character described, the combination, with a hub, the frames mounted near the ends thereof, and the ground wheel mounted between said frames and capable of lateral movement relatively thereto, or resilient bodies carried by said frames and provided with means for supporting said ground wheel in its normal position, and means for controlling the lateral movement thereof, and other means for positively limiting said lateral movement.

11. In a wheel of the character described, the combination, with the hub, the frames mounted near the ends thereof, and the ground wheel mounted between said frames and capable of lateral movement relatively thereto, of resilient bodies carried by said frames and each having a shoulder adapted to engage the adjacent side of said ground wheel, and means for adjusting said resilient bodies relatively to said ground wheel.

12. In a wheel of the character described, the combination, with the ground wheel, a hub capable of movement relatively thereto, and frames carried by said hub and extending on opposite sides of said ground wheel, of resilient bodies mounted on said frames and each having a shoulder adapted to engage the adjacent side of said ground wheel, and brackets pivotally mounted on said ground wheel and adapted to engage said resilient bodies.

13. In a wheel of the character described, the combination, with a ground wheel, and a hub capable of movement relatively to said ground wheel, of a resilient body carried by said hub, and brackets mounted on one side of said ground wheel and engaging said resilient body.

14. In a wheel of the character described, the combination, with a ground wheel, and a hub capable of movement relatively to said ground wheel, of a resilient body carried by said hub, and brackets pivotally mounted on one side of said ground wheel and engaging said resilient body, the pivotal centers of said brackets being radially within the circumference of the resilient body.

15. In a wheel of the character described, the combination, with a ground wheel, and a hub capable of movement relatively to said ground wheel, of a resilient body carried by one of said members, brackets carried by the other of said members and adapted to engage said resilient body, said resilient body being mounted at one side of said ground wheel.

16. In a wheel of the character described, the combination, with a ground wheel, and a hub capable of movement relatively thereto, of a resilient body carried by said hub, and pivotal supports carried by said ground wheel, the pivots of the supports being radially within the circumference of the resilient body.

17. In a wheel of the character described, the combination, with the ground wheel and a hub capable of movement relatively thereto, of annular resilient bodies carried by said hub and located on opposite sides of and in lateral engagement with said ground wheel, brackets pivotally mounted on both sides of said ground wheel and adapted to engage the peripheries of said resilient bodies, other brackets rigidly mounted on both sides of said ground wheel and normally out of engagement with said resilient bodies, the fixed brackets on one side of said wheel being opposite the pivoted brackets on the opposite side of said wheel.

In testimony whereof, I affix my signature in presence of two witnesses.

MARION MILTON BAILEY.

Witnesses:
A. C. LINK,
EDWARD L. REED.